United States Patent Office 3,755,457
Patented Aug. 28, 1973

3,755,457
PREPARATION OF TETRAKIS(ALPHAHYDROXY-ORGANO)PHOSPHONIUM ACID SALTS FROM ELEMENTAL PHOSPHORUS
Ronald H. Carlson, Lewiston, N.Y., assignor to Hooker Chemical Corporation, Niagara Falls, N.Y.
No Drawing. Filed Aug. 25, 1971, Ser. No. 174,953
Int. Cl. C07f 9/28
U.S. Cl. 260—606.5 F    13 Claims

ABSTRACT OF THE DISCLOSURE

Tetrakis(alphaorgano)phosphonium acid salts, and specifically tetrakis(hydroxymethyl)phosphonium chloride, are prepared by a process which includes the step of reacting elemental phosphorus and an aldehyde, such as formaldehyde, with hydrochloric acid, in the presence of an electropositive metal. Other acid salts of the tetrakis(hydroxyorgano)phosphonium compound can be prepared by substituting other acids, e.g., hydrobromic acid, sulfuric acid, phosphoric acid, and the like, for hydrochloric acid.

These compounds are useful as fireproofing agents for cellulosic textile materials.

SUBJECT MATTER OF INVENTION

This invention relates to a novel process for the preparation of tetrakis(alphahydroxyorgano)phosphonium acid salts. More particularly this invention is directed to a novel process for the preparation of tetrakis(hydroxymethyl)phosphonium chloride by reaction of elemental phosphorus, formaldehyde and hydrochloric acid in the presence of an electropositive metal.

BACKGROUND OF THE INVENTION

Tetrakis(hydroxyalkyl)phosphonium salts were prepared by Messinger et al., Berichte 21 326 (1888), by reaction of phosphine with alkyl aldehyde using dry hydrogen chloride as a catalyst. Raver et al., Zh. Ob. Khim. 32 2, 558–590, (1962) disclosed the reaction of phosphine and formaldehyde under superatmospheric pressure but in the absence of a catalyst to form tetrakis(hydroxymethyl)phosphonium hydroxide. Reuter et al., U.S. Pat. 3,007,969, have disclosed the preparation of tetra(hydroxymethyl)phosphonium hydroxide by reacting one mole of formaldehyde with ¼ mole of phosphine in the presence of slight amounts of finely distributed metals or their compounds. In copending application, Ser. No. 54,574, filed July 13, 1970, a two step reaction of phosphine and aqueous formaldehyde is disclosed in which the tris(hydroxymethyl)phosphine hemiacetal formed in the first step is hydrolyzed with hydrochloric acid in the second step to produce tetrakis(hydroxymethyl)phosphonium chloride.

These and other less pertinent procedures utilize phosphine as a reactant. Phosphine, as is well known, is a hazardous chemical and one which is not only difficult to handle in large scale commercial equipment but also often in short supply.

OBJECTS OF THE INVENTION

It is therefore a principal object of this invention to devise a process for the preparation of tetrakis(alphahydroxyorgano)phosphonium acid salts from relatively safe, simple, and economical materials.

It is another object to devise a process for the preparation of tetrakis(hydroxymethyl)phosphonium acid salts from elemental phosphorus and formaldehyde.

These and other objects of this invention will be apparent from the following description of the invention.

BRIEF DESCRIPTION OF THE INVENTION

It has now been discovered that tetrakis(alphahydroxyorgano)phosphonium acid salts can be prepared in high yield and purity directly from elemental phosphorus, specifically yellow phosphorus ($P_4$), an aldehyde and an acid, for example hydrochloric acid, in the presence of an electropositive metal by heating these reactants in an inert atmosphere until the reaction is substantially complete.

This novel reaction can be expressed by the following equation, wherein the acid used is hydrochloric acid and the aldehyde is formaldehyde $$P + 3/nM + 4HCl + 4HCHO \rightarrow P(CH_2OH)_4Cl + 3/nMCl_n$$

where M is an electropositive metal and $n$ is the electrochemical equivalent of the metal.

The resulting aqueous reaction mixture can be stripped under reduced pressure to obtain the crude reaction product as a viscous oil from which the metal salts can be removed in a known manner.

DETAILED DESCRIPTION OF THE INVENTION

Tetrakis(alphahydroxyorgano)phosphonium acid salts are prepared by heating in an inert atmosphere a mixture of elemental phosphorus, an aldehyde, an acid, and an electropositive metal, and thereafter evaporating the aqueous mixture.

The tetrakis(alphahydroxyorgano)phosphonium acid salts obtainable by the process of this invention may be further defined as compounds having the formula

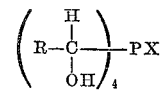

wherein R is selected from the group consisting of hydrogen, lower alkyls having from 1 to 6 carbon atoms, halogenated lower alkyl having from 1 to 6 carbon atoms, halogenated lower alkenyl having from 1 to 6 carbon atoms, aryls having from 5 to 10 carbon atoms, halogenated aryls having from 5 to 10 carbon atoms, cycloalkyls having from 3 to 6 carbon atoms, halogenated cycloalkyls having from 3 to 6 carbon atoms, and X is an anion of an acid such as hydrochloric acid, hydrobromic acid, sulfuric acid, phosphoric acid, phosphonic acid, formic acid, acetic acid, oxalic acid and the like.

Typical examples of these tetrakis(alphahydroxyorgano)phosphonium acid salts are tetrakis(hydroxymethyl)phosphonium chloride
tetrakis(alphahydroxyethyl)phosphonium bromide
tetrakis(alphahydroxypropyl)phosphonium sulfate
tetrakis(alphahydroxybenzyl)phosphonium chloride
tetrakis(alphahydroxycyclohexyl)phosphonium phosphate
tetrakis(alphahydroxy-4-chlorocyclohexyl)phosphonium chloride
tetrakis(alphahydroxypropenyl)phosphonium acetate
tetrakis(alphahydroxybutyl)phosphonium bromide Mixtures of these compounds are contemplated also.

Of these, the preferred phosphonium acid salt is tetrakis(hydroxymethyl)phosphonium chloride, and hereinafter, primary reference will be made to this material. This is not however to be taken as a limitation of the compounds which may be prepared by the process of this invention but merely as being exemplary of such materials.

Broadly stated, the process of the present invention comprises the step of reacting elemental phosphorus with an aldehyde having the formula

wherein R has the above defined meaning and an acid in the presence of an electropositive metal.

In accordance with a preferred modification a mixture of about 1 atomic proportion of phosphorus, about 2 to 3, and especially about 2 atomic proportions of zinc powder, and 3 to about 5, and especially about 4 molecular proportions of aqueous formaldehyde is heated in an atmosphere of nitrogen to about 40 to about 60 degrees centigrade. Thereafter, concentrated hydrochloric acid, in excess of about four molecular proportions is added dropwise to the warm mixture which is being agitated vigorously. The mixture is agitated and heated at about 60 to 90 degrees centigrade until the phosphorus and zinc have reacted, and a clear solution results. Thereafter, the reaction mass is dried by evaporation under reduced pressure and the metal salts removed from the viscous residual oil product to obtain the desired tetrakis(hydroxymethyl)phosphonium chloride product.

The reaction is carried out in the presence of an electropositive metal, i.e., a metal standing above hydrogen in the electromotive series of metals. Thus the electropositive metals suitable for use in this reaction include, zinc, lead, magnesium, iron, aluminum, tin and sodium, the latter most conveniently in the form of sodium amalgam. Mixtures of these metals can be used also.

The metal reactant is used preferably in finely divided form, that is in a form presenting a large surface area which has been found to be the more highly reactive form. At least the stoichiometric amount of the metal, and preferably a slight excess should be used.

The acid used is preferably hydrochloric acid, and in a concentrated form, e.g., 37.5% hydrochloric acid. Other acids such as sulfuric, phosphoric, hydrobromic, formic, acetic and the like acids can be used. It will be evident to those skilled in this art, that the acid salt obtained will be the salt of the acid used. Thus hydrochloric acid will produce the phosphonium chloride, sulfuric acid will produce the phosphonium sulfate, and formic acid will produce the phosphonium formate.

The amount of acid used should be at least sufficient to react substantially completely with the metal and form the acid salt. Preferably, an excess of the acid is used.

The aldehyde component is conveniently added to the reaction mixture as an aqueous solution or dispersion, such as 37 percent aqueous formaldehyde. Paraformaldehyde and other commercially available polymeric forms of formaldehyde can be used also. At least a stoichiometric amount and preferably a slight excess of formaldehyde, based on the proportion of phosphorus should be used.

Yellow phosphorus, which is sometimes referred to as "white phosphorus," is preferably employed as the phosphorus reactant. However, any form of phosphorus which is converted to yellow phosphorus under the reaction conditions obtained, may be employed.

The reaction is carried out in an inert atmosphere. Inert gases such as nitrogen, argon, helium and the like are suitable. Conveniently, the reactants are placed in a suitable reaction vessel which then is flushed out with the inert gas and a slow steady stream thereof is passed through the mixture during the reaction. It is especially preferred to maintain a positive pressure of inert gas over the reaction mixture during the reaction.

The reaction can be effected over a wide temperature range. A temperature within the range of from about 40 degrees to the boiling point of the reaction mixture can be used. Preferably, a temperature within the range of about 50 to 90 degrees is used. Higher temperatures, e.g., in excess of 100 degrees centigrade, unless pressure equipment is used, favor the formation of undesirable by-products and thus lower yields of the desired product.

Although it is preferred to carry out the reaction by adding the acid reactant to the mixture of the phosphorus, formaldehyde and metal, the reaction can be effected by adding the metal to a mixture of the other reactants.

The reaction can be carried out at atmospheric, subatmospheric or superatmospheric pressure. Furthermore, the reaction can be effected in a batchwise or continuous fashion.

Although it is not desired to be bound by any specific reaction mechanism, it is believed that the process of this invention proceeds by the initial absorption of the phosphorus on the surface of the electropositive metal. Thereafter, and in the presence of the acid, the phosphorus reacts with the nascent hydrogen generated by the metal-acid reaction to form a reactive compound of phosphorus and hydrogen which then, in-situ, reacts with the formaldehyde and acid to form the acid salt of the tetrakis(hydroxymethyl)phosphonium compound.

Tetrakis(hydroxymethyl)phosphonium acid salts and especially tetrakis(hydroxymethyl)phosphonium chloride have been used extensively in the flameproofing of cellulosic materials and related substances.

The following examples will illustrate various specific embodiments of the present invention, but are not to be construed as limitations of the scope of the invention. Parts and percentages are by weight and temperatures are in degrees centigrade unless otherwise indicated.

EXAMPLE I

A mixture of 3.2 parts (0.103 moles) of yellow phosphorus, 13 parts (0.199 mole) of zinc powder, 35.6 parts (0.435 mole) of 37% aqueous formaldehyde and 17 parts of distilled water was placed in a flask and the flask purged with nitrogen. The mixture was agitated and warmed to 50°, and concentrated hydrochloric acid, 95.2 parts (0.979 mole), was added dropwise. The temperature of the reaction mass rose spontaneously to about 80°, at which temperature the mixture was maintained until the acid addition was completed and until the phosphorus and zinc were completely in solution. During the reaction period, about three hours, the reaction mixture was maintained under a positive pressure of nitrogen, venting the gas into an aqueous sodium hypochlorite solution. No phosphine was detected in the off gas as indicated by a negative reaction on silver nitrate test paper.

Following dissolution of the phosphorus and zinc components, the reaction mixture, weighing 156.9 parts, had the following properties:

(a) Color—colorless
(b) Odor of formaldehyde
(c) pH $<0$
(d) IR spectrum showed characteristic tetrakis(hydroxymethyl)phosphonium chloride absorption at 1043 cm.$^{-1}$ due to C—O stretching vibration of —CH$_2$OH group.
(e) $^{31}$P NMR spectrum showed characteristic absorption at —25.8 p.p.m. from external H$_3$PO$_4$.
(f) Phosphorus content=1.75%
(g) Zinc content=8.0%

On the assumption that all the phosphorus was present as combined in tetrakis(hydroxymethyl)phosphonium chloride, the reaction mixture contained 10.8% of that salt and also 16.7% zinc chloride. This represents a conversion of phosphorus to tetrakis(hydroxymethyl)phosphonium chloride of 86.0%. The $^{31}$P NMR spectrum of the phosphorus containing solution showed only one peak at —25.8 p.p.m. indicating the tetrakis(hydroxymethyl) phosphonium chloride to comprise greater than 95 mole percent of the phosphorus values present.

EXAMPLE 2

An aliquot (31.4 parts) of the reaction mixture prepared in Example 1 above was evaporated to dryness in a Rinco evaporator (30 mm. Hg terminal vacuum) over an 85-degree water bath. A viscous light green oil, 8.61 parts, was obtained. IR analysis of the oil again confirmed the presence of tetrakis(hydroxymethyl)phosphonium chloride. The oil contained 5.75 percent phosphorus and 29.0 percent zinc, representing a content of 35.4 percent of tetrakis(hydroxymethyl)phosphonium chloride and 60.6 percent of zinc chloride.

The $^1$H NMR spectrum of the stripped oil in deuterium oxide showed a characteristic THPC doublet ($J_{PH}=1.5$ cycles) at 5.17 p.p.m. downfield from external tetramethylsilane. The $^{31}$P NMR spectrum of the stripped oil again showed only one peak at −25.7 p.p.m. from external $H_3PO_4$ indicating tetrakis(hydroxymethyl)phosphonium chloride to constitute greater than 95 mole percent of the phosphorus values present.

EXAMPLE 3

In a manner analogous to that described in Examples 1 and 2 above, but in which an atomic equivalent amount of finely divided lead was used instead of zinc powder, an oil containing tetrakis(hydroxymethyl)phosphonium chloride and plumbous chloride was obtained. Analysis of the oil indicated it to contain 10.95 percent phosphorus and 7.58 percent lead. The infra-red spectrum displayed the characteristic tetrakis(hydroxymethyl)phosphonium chloride absorption.

EXAMPLE 4

The procedure of Examples 1 and 2 was repeated using an equivalent amount of sodium amalgam (containing 0.2 percent sodium) in place of zinc as the electropositive metal. During the course of this reaction, phosphine was detected in the off gas. The aqueous reaction mixture contained 0.064 percent phosphorus and the presence of tetrakis(hydroxymethyl)phosphonium chloride was indicated by the IR spectra of the solution.

As many variations in the specifically disclosed embodiments of this invention may be made without departing from the spirit or scope thereof, it is to be understood that this invention is not limited to these specific embodiments except as defined in the appended claims.

What is claimed is:

1. A process for the preparation of tetrakis(alphahydroxyorgano)phosphonium acid salts of the formula

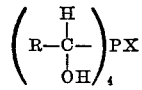

wherein R is selected from the group consisting of hydrogen, lower alkyls of from 1 to 6 carbon atoms, halogenated lower alkyls of from 1 to 6 carbon atoms, lower alkenyls of from 1 to 6 carbon atoms, halogenated lower alkenyls of from 1 to 6 carbon atoms, aryls of from 5 to 10 carbon atoms, halogenated aryls of from 5 to 10 carbon atoms, cycloalkyls of from 3 to 6 carbon atoms and halogenated cycloalkyls of from 3 to 6 carbon atoms and X is an anion of the group consisting of sulfate, phosphate, bromide, chloride, formate, and acetate, which comprises the step of reacting yellow phosphorus with an aldehyde of the formula

wherein R has the above defined meaning, and an acid of the group consisting of hydrochloric acid, sulfuric acid, phosphoric acid, hydrobromic acid, formic acid and acetic acid, in the presence of an electropositive metal of the group consisting of zinc, lead, magnesium, iron, aluminum, tin, sodium, sodium amalgam and mixtures thereof.

2. The process of claim 1 wherein the aldehyde used is aqueous formaldehyde.

3. The process of claim 2 wherein the acid is added slowly to a mixture of the phosphorus, aqueous formaldehyde and the electropositive metal.

4. The process of claim 3 wherein the reaction is carried out at a temperature within the range of about 40 and about 90 degrees centigrade.

5. The process of claim 4 wherein the acid is concentrated hydrochloric acid.

6. The process of claim 4 wherein the electropositive metal is zinc.

7. The process of claim 4 wherein the electropositive metal is lead.

8. The process of claim 4 wherein the electropositive metal is sodium.

9. The process which comprises the steps of
   (1) slowly adding concentrated hydrochloric acid to a warm mixture of yellow phosphorus and aqueous formaldehyde in the presence of an electropositive metal of the group consisting of zinc, lead, magnesium, iron, aluminum, tin, sodium, sodium amalgam and mixtures thereof in finely divided form,
   (2) heating the resultant mixture at a temperature within the range of about 60 to about 90 degrees centigrade until the phosphorus and the metal have substantially completely dissolved in the reaction mixture, and thereafter,
   (3) evaporating the clear reaction mixture to dryness to recover therefrom tetrakis(hydroxymethyl)phosphonium chloride.

10. The process of claim 9 wherein the electropositive metal is zinc.

11. The process of claim 9 wherein the electropositive metal is lead.

12. The process of claim 10 wherein one atomic proportion of phosphorus is reacted with about 2 to 3 atomic proportions of zinc, about 3 to 5 molecular proportions of formaldehyde and at least about four molecular proportions of hydrochloric acid.

13. The process of claim 12 wherein one atomic proportion of phosphorus is reacted with about 2 atomic proportions of zinc, about 4 molecular proportions of formaldehyde and about four molecular proportions of about 37 percent by weight hydrochloric acid.

References Cited

UNITED STATES PATENTS

| | | | |
|---|---|---|---|
| 2,912,466 | 11/1959 | Reuter | 260—606.5 F |
| 3,316,293 | 4/1967 | Carr et al. | 260—606.5 F |

FOREIGN PATENTS

| | | | |
|---|---|---|---|
| 1,041,957 | 10/1958 | Germany | 260—606.5 F |

OTHER REFERENCES

Kuznetsov et al., Tr. Kazukhsk Khim.-Tekhnol Inst. (1960), No. 29, 20–1 (abstract only).

Roitburd, Zh. Khim. (1962), abstract No. 21 zh 238 (abstract only).

LORRAINE A. WEINBERGER, Primary Examiner

R. D. KELLY, Assistant Examiner

U.S. Cl. X.R.

260—541, 542

UNITED STATES PATENT OFFICE
CERTIFICATE OF CORRECTION

Patent No. 3,755,457  Dated August 28, 1973

Inventor(s) Ronald H. Carlson

It is certified that error appears in the above-identified patent and that said Letters Patent are hereby corrected as shown below:

Column 5, line 57, formula "$\overset{O}{\underset{}{\overset{\|}{C}}-H}$" should read --- $\overset{O}{\underset{}{\overset{\|}{R C}}-H}$ ---.

Signed and sealed this 27th day of November 1973.

SEAL)
Attest:

EDWARD M. FLETCHER JR.  RENE D. TEGTMEYER
Attesting Officer  Acting Commissioner of Patents